United States Patent [19]

O'Sullivan et al.

[11] Patent Number: 4,980,683

[45] Date of Patent: Dec. 25, 1990

[54] AIRCRAFT INSTRUMENT SYSTEMS

[75] Inventors: Peter-Francis O'Sullivan; Keith G. Dougan, both of Cheltenham, England

[73] Assignee: Smiths Industries Public Limited Company, London, England

[21] Appl. No.: 431,406

[22] Filed: Nov. 3, 1989

[30] Foreign Application Priority Data

Nov. 23, 1988 [GB] United Kingdom ................ 8827345

[51] Int. Cl.[5] ............................................ G08G 5/04

[52] U.S. Cl. ..................................... 340/961; 342/29; 364/461

[58] Field of Search .................. 340/961, 980; 342/29, 342/30; 364/461, 439

[56] References Cited

U.S. PATENT DOCUMENTS

| | | | |
|---|---|---|---|
| 3,614,728 | 10/1971 | Borrok et al. | 340/961 |
| 3,621,210 | 11/1971 | Canning et al. | 340/961 |
| 3,699,511 | 10/1972 | Fletcher et al. | 340/961 |
| 3,846,746 | 11/1974 | Trageser et al. | 340/961 |
| 4,181,405 | 1/1980 | Cohen | 340/980 |
| 4,403,220 | 9/1983 | Donovan | 342/29 |
| 4,835,537 | 5/1989 | Manion | 340/961 |

OTHER PUBLICATIONS

"At the Crossroads in Air Traffic Control", IEEE Spectrum, Jul. 1970, pp. 69-83, Friedlander, Cl. 364-439.

"TCAS II Equipment", Aviation International News, 7-01-89, Tripp.

*Primary Examiner*—Donnie L. Grosland
*Assistant Examiner*—Brent Swarthout
*Attorney, Agent, or Firm*—Pollock, VandeSande and Priddy

[57] ABSTRACT

An aircraft collision avoidance instrument system has a display located in the aircraft glareshield in the peripheral field of view of the pilot when the pilot is looking forwardly through the aircraft window. The display has a matrix array of LCD elements which is controlled to provide a continually changing image that is visible in the peripheral field of view of the pilot when a possible collision with another aircraft is likely. The changing image may be arrows moving up or down the display to indicate climb or decend, or a flashing horizontal line to indicate that present height must be maintained. An alphanumeric legend indicative of the collision avoidance action to be taken is also provided by the display. When no collision is likely, the display is used to present other information to the pilot.

8 Claims, 1 Drawing Sheet

AIRCRAFT INSTRUMENT SYSTEMS

BACKGROUND OF THE INVENTION

This invention relates to aircaft instrument systems.

With the increasing amount of air traffic there is a corresponding increasing risk of collision between two aircraft. Some aircraft already carry radar that are capable of identifying other aircraft within a certain range. The interpretation of radar images provided by such instruments is, however, difficult, especially in congested airspace and it may not be readily apparent whether a target aircraft is at the height and on a path that could result in a collision. The difficulty of interpeting such radar displays is increased by the other tasks which the aircrew have to perform, especially during landing and take-off maneuvers which generally take place where air traffic congestion is most severe.

If the pilot does identify a target aircraft on a collision course and takes evading action, this may not avoid danger if the pilot of the target aircraft also takes evading action of the kind that negates the action taken by the pilot of the first aircraft.

In order to reduce the risk of such collisions, it has been proposed that all aircraft carry a traffic alert and collision avoidance system (TCAS) that would alert the pilot of possible collision and advise him of what evading action, if any, he should take. The pilots of the two aircraft on a collision course would each be advised of evading action that would not conflict with evading action taken by the other pilot.

As previously proposed, the TCAS system would include a modified vertical speed indicator instrument (VSI) that would replace the conventional VSI. The modified VSI would have colored sectors movable around the dial of the instrument in such a way that the location of the sectors indicate to the pilot that he should climb, reduce height, maintain height or maintain/reduce his present rate of climb/descent. Such an instrument may function satisfactorily providing that it is watched carefully by the pilot. However, once alerted about a possible collision danger, the natural instinct of the pilot is to identify visually the colliding aircraft by looking through the cockpit window, rather than to look down at the instrument panel.

BRIEF SUMMARY OF THE INVENTION

It is an object of the present invention to provide an aircraft instrument system that can be used to avoid the above-mentioned disadvantage.

According to one aspect of the present invention there is provided an aircraft instrument system including means to identify when a possible collision with another aircraft is likely, means for providing a signal indicative of evading action to be taken by the pilot of the aircraft to avoid collision, visual display means located in the peripheral field of view of the pilot when he is looking forwardly through the aircraft window, and the visual display means being controlled by the signal to provide a continually changing display image while the evading action is necessary such that the changing image is visible to the pilot in his peripheral field of view and the pilot is thereby visually advised of the evading action without the need to look directly at the display.

The visual display means is preferably provided by a matrix array of electrically-energizable elements. The visual display means may be mounted in the aircraft glareshield. The display means may be arranged to provide a representation of upwardly moving signs when the signal indicates that the pilot should climb, and may be arranged to provide a representation of downwardly moving signs when the signal indicates that the pilot should descend. The signs are preferably arrows. The display means may be arranged to provide a flashing representation of a stationary sign when the signal indicates that the pilot should maintain height. The stationary sign may be a horizontal line. The visual display means may be arranged also to provide a display of an alphanumeric legend indicative of the evading action to be taken by the pilot. The system preferably includes means for driving the visual display means to represent to the pilot information other than collision avoidance action when no collision is likely. The system may include an audible indicator that is operable to indicate that collision avoidance information is being presented on the visual display means.

A collision avoidance system for an aircraft, in accordance with the present invention, will now be described, by way of example, with reference to the accompanying drawings.

DETAILED DESCRIPTION OF PREFERRED EMBODIMENT

Figure 1:
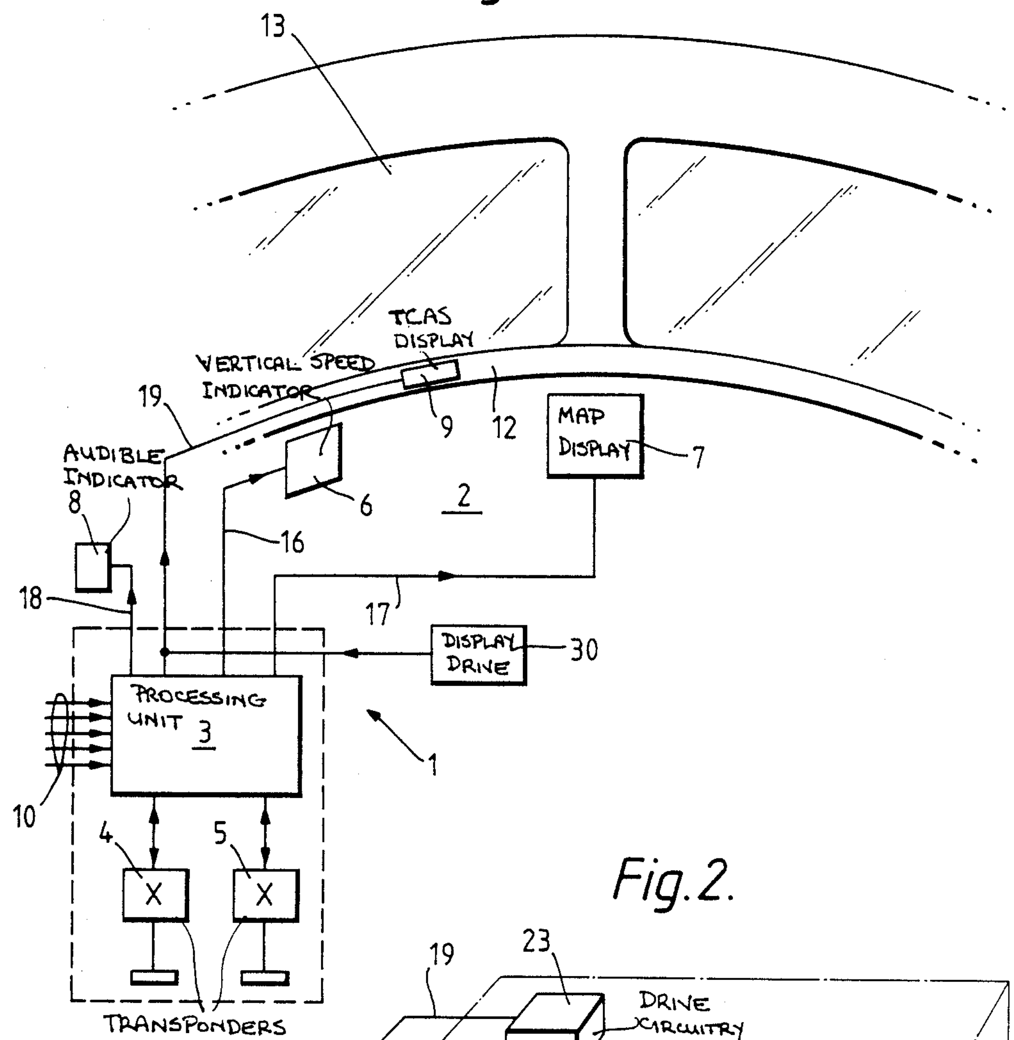
FIG. 1 illustrates the installation of the system in an aircraft cockpit.

The system is indicated generally by the numeral 1 and is shown in FIG. 1 installed in the cockpit 2 of an aircraft. The system 1 comprises a processing unit 3 coupled with radio transponders 4 and 5 and which provides output signals to indicators 6 to 9.

The processing unit 3 and transponders 4 and 5 are of the kind specified in ARINC 735 Draft 8 and are not novel. It is not necessary to give full details of the system since these will be apparent from the ARINC document. Briefly, the transponders 4 and 5 respond to interrogation by a TCAS system fitted on another aircraft to give that aircraft information about the first aircraft's location and movement. In this respect, information about the position, speed, bearing, height and rate of change of height of the aircraft is supplied on lines 10, from various aircraft transducers, to the processing unit 3 which in turn supplies this information to the transponders 4 and 5. The transponders 4 and 5 also interrogate equivalent transponders on the other aircraft so that both aircraft have information about the location and movement of the other aircraft. The processing unit 3 supplies signals via line 17 to the indicator 7 which is in the form of a map display, such as a conventional weather map display. The map display 7 thereby provides an indication of the location of selected target aircraft within a predetermined range. The processing unit 3 also identifies when there is a possibility of collision with other aircraft and assesses what evasive action should be taken by the pilot to avoid such a collision. The system 1 may signal to other aircraft, via the transponders 4 and 5, what evasive action has been advised such that a similar TCAS system on the potential collision aircraft takes this into account when advising what evasive action should be taken by that aircraft.

The processing unit S signals that evasive action is necessary to the indicators 6, 8 and 9 via lines 16, 18 and 19 respectively. The indicator 6 is a modified vertical speed indicator (VSI) which has movable colored sections of the kind proposed in ARINC 735 Draft 8. The VSI 6 is located in the usual position for a VSI, that is, below the window of the cockpit. By looking at the VSI 6, the pilot can determine whether he should climb, descend or maintain present height or rate of change of height, in order to avoid a collision. This information, however, is only apparent to the pilot by looking directly at the VSI 6 and by observation Of the pointer in relation to the colored sectors.

The indicator 8 is an audible indicator, such as a buzzer or simulated voice, and is actuated to alert the pilot of a possible collision and thereby warn him to look at the visual indicators 6 or 9 in order to be advised about what evasive action should be taken.

Figure 2:
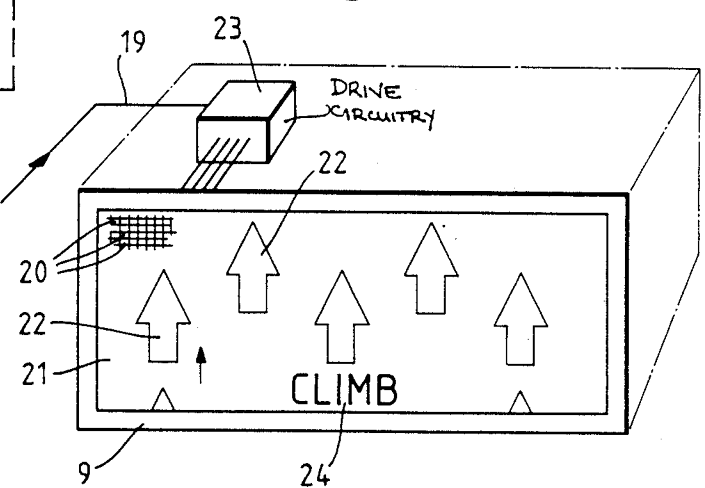
FIG. 2 is a schematic diagram showing a part of the system in greater detail.

The other indicator 9, as mentioned above, is a visual display located in the glareshield 12 just below the cockpit window 13 in the peripheral field-of-view of the pilot when he is looking forwardly out of the cockpit window. The display 9, as shown in FIG. 2, has a matrix array of electrically-energizable elements 20 such as provided by liquid crystal display elements. Typically, the front panel 21 of the display is rectangular in shape being about 130 mm long in the horizontal direction and 40 mm high. The display 19 includes drive circuitry 23 coupled with the elements 20 and is arranged to energize selected ones of the elements so as to provide a continually changing display image while evasive action is necessary. For example, when the pilot is required to climb, the circuitry 23 may be arranged to provide a display representation of several upwardly-directed arrows 22 or similar signs that are moved continuously up the panel 21. When the pilot is required to descend, the arrows may instead point down and be moved continuously down the panel 21. Because the display 9 is located in the pilot's peripheral field-of-view and because a continuously changing image is provided, the pilot can readily see the information presented by the display without the need to look directly at the display. Although detailed information cannot be presented to the pilot in this way, he is able readily to distinguish between, for example, arrows moving up and down. Other display representations can be provided to advise the pilot to maintain his present height, such as, for example, by flashing a stationary horizontal line, or similar sign—in this way, a changing display is provided without movement. The display may also display other information such as an alphanumeric legend 24 'CLIMB', 'DESCEND' or the like. Although this would not be visible to the pilot while he is looking out the window, he may glance down at the panel 21 when his attention is caught by the moving arrows, or the like, and is then able to read the legend.

For most of the time of operation of the aircraft, there will be no collision risks and the display 9 may be used to display other information to the pilot such as derived from a display drive unit 30.

What we claim is:

1. An aircraft instrument system for a first aircraft comprising: means to identify when a possible collision with a second aircraft is likely; means for determining the evading action to be taken by the pilot of the first aircraft to avoid collision; means for providing a first signal when the evading action is to climb, and a second signal when the evading action is to descent; visual display means including a matrix array of electrically energizable elements; means mounting said visual display means in the peripheral field of view of the pilot when the pilot is looking forwardly through the aircraft window; means supplying said first and second signals to the visual display means to control the elements in said matrix array to provide a display image of upwardly moving signs and downwardly moving signs respectively such as to produce two alternative changing images on a single display that are visible to the pilot in the pilot's peripheral field of view and that are distinguishable form one another in the pilot's peripheral field of view, thereby to visually advise the pilot of the first aircraft to climb or descent without the need for the pilot to look directly at said visual display means.

2. An instrument system according to claim 1, wherein the first aircraft has a glareshield, and wherein said mounting the means mounts the visual display means in the aircraft glareshield.

3. An instrument system according to claim 1, wherein said signs are arrows.

4. An instrument system according to claim 1, wherein the display means is arranged to provide a flashing representation of a stationary sign when the signal indicates that the pilot should maintain height.

5. An instrument system according to claim 6, wherein the stationary sign is a horizontal line.

6. An instrument system according to claim 1, wherein the visual display means also provides a display of an alphanumeric legend indicative of the evading action to be taken by the pilot.

7. An instrument system according to claim 1, wherein the system includes means for driving the visual display means to represent to the pilot information other than collision avoidance action when no collision is likely.

8. An instrument system according to claim 1, wherein the system includes an audible indicator which is operable to indicate that collision avoidance information is being presented on the visual display means.

* * * * *